G. E. HENRY.
BRAKE SETTING MECHANISM
APPLICATION FILED APR. 27, 1914.
1,122,500.
Patented Dec. 29, 1914.
2 SHEETS—SHEET 2.
Fig. 4.
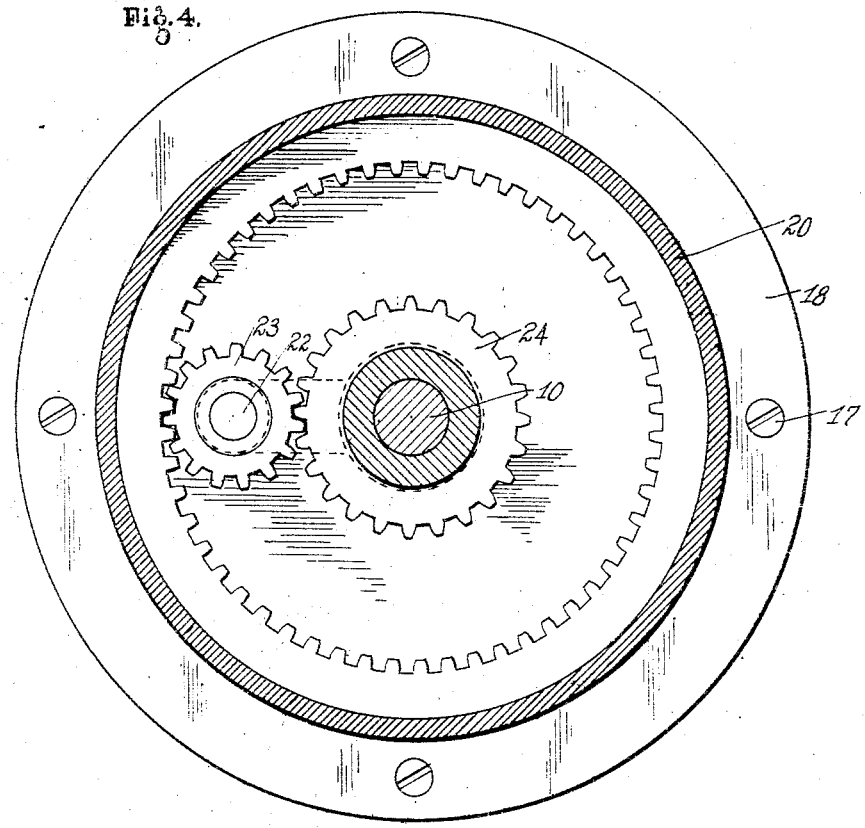
Fig. 5
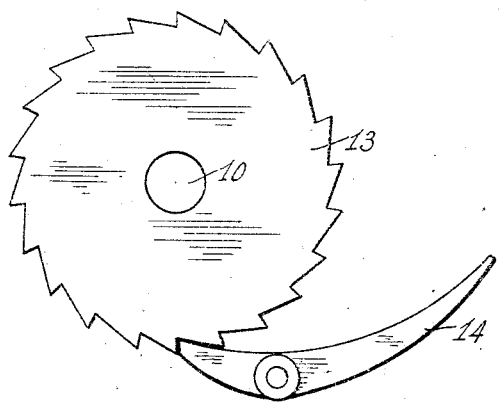
WITNESSES:
INVENTOR.
George E. Henry.
BY 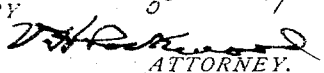
ATTORNEY.

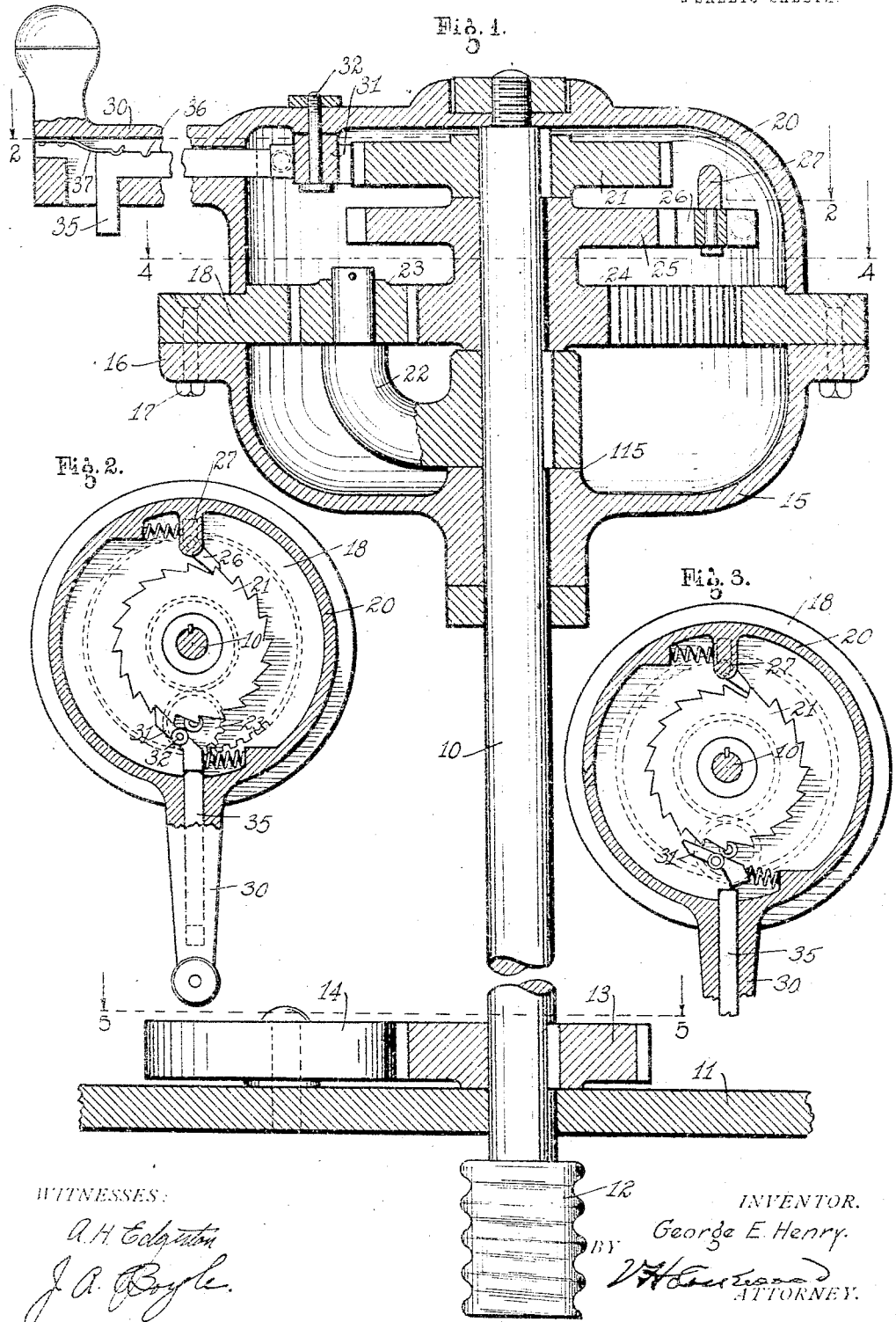

UNITED STATES PATENT OFFICE.

GEORGE E. HENRY, OF VINCENNES, INDIANA.

BRAKE-SETTING MECHANISM.

1,122,500.

Specification of Letters Patent. Patented Dec. 29, 1914.

Application filed April 27, 1914. Serial No. 834,718.

*To all whom it may concern:*

Be it known that I, GEORGE E. HENRY, a citizen of the United States, and a resident of Vincennes, county of Knox, and State of Indiana, have invented a certain new and useful Brake-Setting Mechanism; and I do hereby declare that the following is a full, clear, and exact description thereof, reference being had to the accompanying drawings, in which like letters refer to like parts.

The object of this invention is to improve the construction of mechanism for operating brakes for cars and the like so that the mechanism will quickly operate to bring the brake shoe against the wheel and then can be instantly changed in gearing or leverage so as to operate more slowly to set the brake tightly.

This invention is to enable the chain to be wound up more quickly preliminary to the setting of the brakes.

The nature of the invention will be understood from the accompanying drawings and the following description and claims:

In the drawings, Figure 1 is a central vertical section through a brake operating mechanism, a portion of it being broken away. Fig. 2 is a section on the line 2—2 of Fig. 1, showing the parts in position while winding up the loose chain preliminary to setting the brakes. Fig. 3 shows said parts altered while finally setting the brakes. Fig. 4 is a section on the line 4—4 of Fig. 1. Fig. 5 is a section on the line 5—5 of Fig. 1.

There is shown a vertical shaft 10 mounted in the floor frame 11 of a streetcar or the like and having on its lower end a chain spool 12 to which a chain, not shown, is connected and on which it winds and from which it unwinds for the purpose of operating a brake mechanism or brake shoe, not shown, the construction of which is familiar to all those skilled in the art. A ratchet wheel 13 is secured on said shaft near the floor with the usual foot operated pawl 14 for preventing backward movement of the shaft 10.

There is a housing member 15 through which the upper end of the shaft extends and said housing member is secured stationary to some part of the car which is not here shown. Said housing member carries an outwardly extending flange 16 through which bolts 17 extend for securing an annular internal rack member 18 which is also stationary. A casing 20 rests upon the rack member 18 and is rotated from the same during the operation of the device. The shaft 10 extends through said casing 20, but is not rigidly secured thereto. Hence, parts 10 and 20 may be independently rotated. There is keyed on the upper part of the shaft 10 a ratchet wheel 21 and there is keyed on said shaft also an arm 22 that rides on the bearing portion 115 of the housing 15 and said arm 22 carries a pinion 23 which is always in mesh with the stationary rack or gear 18 and it is also always in mesh with a gear 24 loosely mounted on the shaft 10. Said gear 24 is rigidly connected with a ratchet wheel 25 above it and said ratchet wheel 25 is actuated by a spring pawl 26 mounted on an arm 27 from the casing 20. Hence, revolutions of the casing 20 will, through said pawl 26, operate the ratchet 25, and through it, the gear 24 and pinion 23 and arm 22 and shaft 10. Thereby the shaft is actuated slowly for the final setting of the brakes.

A handle 30 is rigidly connected with the housing or casing 20 whereby it is rotated, and by means of a pawl 31, mounted in connection with the top of the casing 20 by a bolt 32, in position to engage the ratchet wheel 21 keyed on the shaft 10, said rotatable housing is caused to actuate the shaft 10 rapidly.

The actuating pawl 31 is released when the slack in the chain is taken up by a push rod 35 longitudinally slidable on the underside of the handle 30 and adapted to engage the outer portion of the pawl 31 and release it. The push rod has notches 36 in it for a latch spring 37 whereby said rod is held in outward or inward position.

The operation is as follows: Assuming that the brakes are loose, the operator first revolves the handle 30, and thereby the casing 20, and through the medium of the pawl 31, the ratchet wheel 21 and shaft 10 are rotated and this is continued until the chain is tightened. Then the operator pushes in the push rod 35 and releases the pawl 31 and thereby releases the ratchet wheel 21. But he continues to revolve the housing 20 and through it and pawl 26, the ratchet wheel 25, gear 24, pinion 23, arm 22 and shaft 10 are all operated, but this causes a slower operation of the shaft 10 than before. In other words, the leverage had been greatly multiplied so that the brake can be tightly set against the wheels. This is because the gear 24 is reduced in diameter and it operates on the shaft 10 through the arm 22 and pinion 23. Said pinion travels around slowly between the ratchet gear 18 and the gear 24.

While the upper ratchet wheel 21 is being actuated for the rapid winding of the chain, the other parts, 25, 24, 23 and 22, are operating all of the time, but in an idle manner, as the rapid rotation of shaft 10 will cause corresponding rapid revolutions of arm 22, pinion 23, gear 24 and ratchet wheel 25. During that time the pawl 26 rides on the ratchet wheel sufficiently to take up the difference in movement between the casing 20 and ratchet wheel 25. As soon as the pawl 31 is discontinued from the ratchet wheel 20, then the further operation of the casing through the handle 30, will produce only a very slow rotary movement in the shaft 10.

The invention claimed is:

1. Brake operating mechanism including a brake-chain winding shaft, a housing in which said shaft is partially mounted, and gearing mounted in connection with said shaft and within said housing for actuating said shaft at different speeds.

2. Brake operating mechanism including a brake-chain winding shaft, a housing in which said shaft is partially mounted, one portion of said housing being stationary and the other portion thereof being rotatable, gearing on said shaft in said housing, and means mounted in connection with the housing for operating said shaft through said gearing at two different speeds.

3. Brake operating mechanism including a brake-chain winding shaft, a housing in which said shaft is partially mounted and said housing consisting of a stationary portion and a rotatable portion, a handle secured to said rotatable portion for turning it, gearing mounted on said shaft, means on the rotatable portion of the housing for driving said shaft through a portion of said gearing at one speed, and means mounted on the stationary part of said housing for coöperating with the gearing on said shaft for driving it at another speed.

4. Brake operating mechanism including a brake chain winding shaft, a revoluble housing provided with a handle for operating it, a ratchet wheel secured on the shaft, releasable means for transmitting power from the housing to the ratchet wheel, an arm keyed to the shaft, a pinion on said arm, a stationary annular rack with which the pinion meshes, a gear loosely mounted on the shaft for driving the pinion, a ratchet wheel for driving said gear, and means on the housing for driving said last mentioned ratchet wheel.

5. Brake operating mechanism including a brake chain winding shaft, a revoluble housing provided with a handle for operating it, a ratchet wheel secured on the shaft, releasable means for transmitting power from the housing to the ratchet wheel, a stationary housing in which the shaft is mounted, a stationary annular rack secured on said stationary housing and concentric with the shaft, an arm keyed to the shaft, a pinion on said arm meshing with said rack, a gear loosely mounted on the shaft and meshing with said pinion, a ratchet wheel surrounding the shaft and secured to said pinion, and a spring pawl mounted on said revoluble housing in position to actuate said last-mentioned ratchet wheel.

6. Brake operating mechanism including a brake chain winding shaft, a revoluble housing provided with a handle for operating it, a ratchet wheel secured on the shaft, a spring actuated pawl carried by the housing for driving said ratchet wheel, a push rod mounted in connection with the handle for releasing said pawl, means carried by the handle for locking said push rod in its adjusted position, and means actuated by the housing for operating the shaft at slower speed than said ratchet wheel.

In witness whereof, I have hereunto affixed my signature in the presence of the witnesses herein named.

GEORGE E. HENRY.

Witnesses:
J. H. WELLS,
O. M. McLAUGHLIN.